United States Patent [19]
Ako

[11] Patent Number: 5,135,186
[45] Date of Patent: Aug. 4, 1992

[54] FLUTTER CONTROL SYSTEM FOR AIRCRAFT WINGS

[75] Inventor: Hidenobu Ako, Redmond, Wash.

[73] Assignee: Teijin Seiki Co., Ltd., Osaka, Japan

[21] Appl. No.: 708,389

[22] Filed: May 31, 1991

[30] Foreign Application Priority Data

Jun. 4, 1990 [JP] Japan ............................ 2-146447

[51] Int. Cl.⁵ ............................................. B64C 5/10
[52] U.S. Cl. ................................. 244/75 A; 244/90 R; 244/195
[58] Field of Search ................... 244/75 R, 75 A, 193, 244/195, 90 R

[56] References Cited

U.S. PATENT DOCUMENTS

| | | | |
|---|---|---|---|
| 2,514,138 | 7/1950 | O'Connor | 244/75 A |
| 3,734,432 | 5/1973 | Low | 244/75 A |
| 3,781,627 | 12/1973 | Binnig et al. | 244/195 |
| 4,479,620 | 10/1984 | Rogers et al. | 244/75 R |
| 4,562,546 | 12/1985 | Wykes et al. | 244/75 A |
| 4,615,497 | 10/1986 | Seeler et al. | 244/75 A |
| 4,796,192 | 1/1989 | Lewis | 244/75 R |

Primary Examiner—Joseph F. Peters, Jr.
Assistant Examiner—Virna Lissi Mojica
Attorney, Agent, or Firm—Lane, Aitken & McCann

[57] ABSTRACT

A flutter control system of an aircraft wing comprising an actuator mounted on the aircraft wing to control a control surface, flight control command unit for outputting an actuation command signal for actuating the actuator, wing-displacement measurement unit for measuring an actual displacement of a predetermined point on the wing and outputting an actual displacement signal corresponding to the measured actual displacement, normal-wing-displacement prediction unit for predicting a normal displacement of the wing during normal flight in which no disturbance occurs, on the basis of the actuation command signal and of an information signal representing information about atmospheric density, flight speed and actuation position of the actuator and for outputting a predicted normal displacement signal representing the predicted displacement during the normal flight, disturbance-component estimation unit for receiving the actual displacement signal and the predicted normal displacement signal and for outputting a difference signal between these signals, and command-signal correction unit for correcting the actuation command signal so that a wing displacement by disturbance is cancelled out, on the basis of the difference signal.

3 Claims, 3 Drawing Sheets

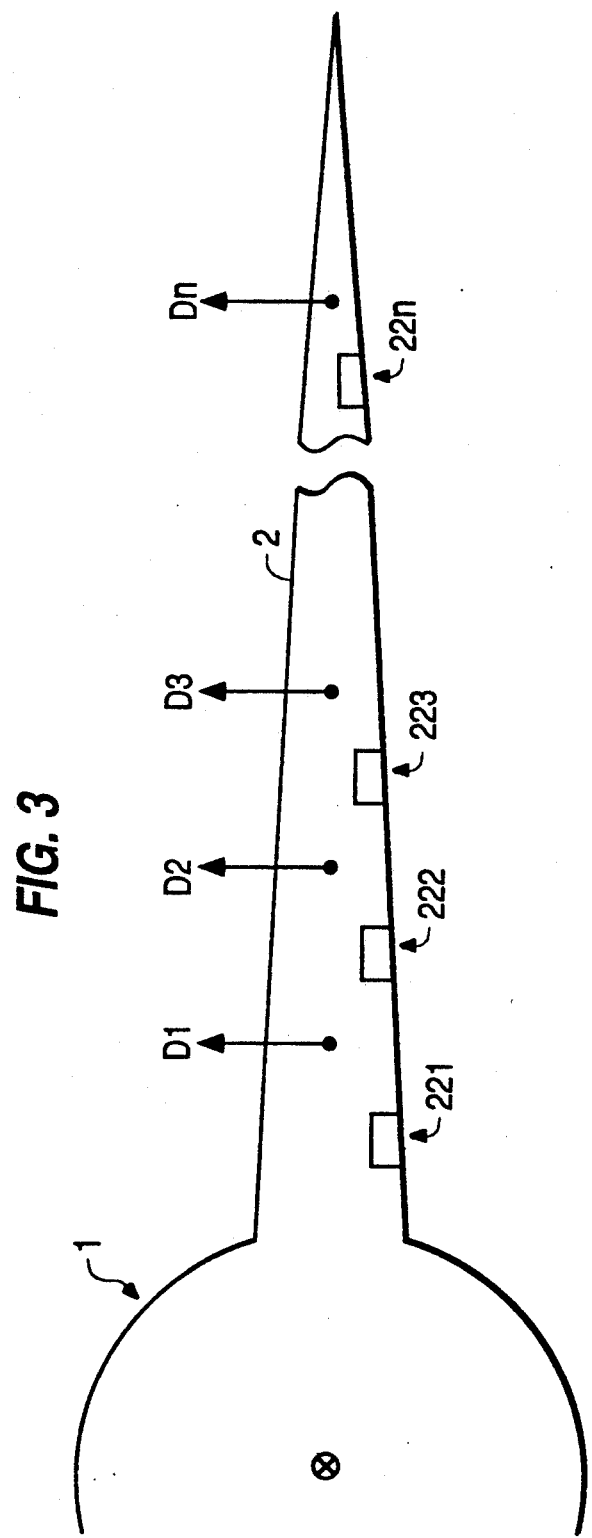

FLUTTER CONTROL SYSTEM FOR AIRCRAFT WINGS

FIELD OF THE INVENTION

The present invention relates to the flutter control system of aircraft wings in which the flutter phenomenon in the main wings, etc. of an aircraft is controlled by an active control.

DESCRIPTION OF THE PRIOR ART

The so-called flutter phenomenon of an aircraft wing is caused to occur by atmospheric pressure change, engine vibration and disturbance during flight and reduces the fatigue life of the wing structure. In order to alleviate an unacceptable reduction in fatigue life, there is, for example, a method which largely obviates the flutter phenomenon by increasing the rigidity of the wing structure. As another example, there is a FMC (Flutter Mode Control) method which artificially controls the flutter phenomenon. In the FMC method, in addition to normal control surfaces, the main wing is provided with a control surface and actuator for controlling the flutter phenomenon, and the torsion, etc. of the wing is detected by means of an accelerometer mounted on the wing. On the basis of the detection signal, the control surface for controlling the flutter phenomenon is driven, so that the swing of the wing is attenuated.

However, since in the former flutter control method for aircraft wings it is necessary to make spars and ribs thick in order to increase the rigidity of the wing structure, so that the wing structure is greatly increased in weight and the flight performance is thus reduced Also, even in the case of the latter flutter control method for aircraft wings, the wing weight is greatly increased because the additional control surface and actuator for controlling flutter phenomenon are provided. Further, a plurality of control surfaces and actuators for controlling the flutter phenomenon had to be provided in order to correspond to a plurality of vibration modes.

Accordingly, it is a main object of the present invention to provide an improved flutter control system which actively controls flutter phenomenon without an increase in wing weight.

It is another object of the present invention to provide an improved flutter control system which is capable of controlling flutter phenomenon in which a plurality of vibration modes exist.

SUMMARY OF THE INVENTION

The foregoing objects are accomplished in accordance with the present invention by providing a flutter control system of an aircraft wing comprising an actuator (11A) mounted on the aircraft wing (2) to control a control surface (3A), flight control command means (51) for outputting an actuation command signal for actuating the actuator (11A), wing-displacement measurement means (21) for measuring an actual displacement of a predetermined point on the wing (2) and outputting an actual displacement signal corresponding to the measured actual displacement, normal-wing-displacement prediction means (41) for predicting a normal displacement of the wing (2) during normal flight in which no disturbance occurs, on the basis of the actuation command signal from the flight-control command means (51) and of an information signal representing information about atmospheric density, flight speed and actuation position of the actuator and for outputting a predicted normal displacement signal representing the predicted displacement during the normal flight, disturbance-component estimation means (31) for receiving the actual displacement signal from the wing-displacement measurement means (21) and the predicted normal displacement signal from the normal-wing displacement prediction means (41) and for outputting a difference signal between these signals, and command-signal correction means (61) for correcting the actuation command signal outputted from the flight control command means (51) so that a wing displacement by disturbance is compensated, on the basis of the difference signal from the disturbance-component estimation means (31).

The wing-displacement measurement means (21) may comprise a sensor (22A) for sensing strain caused by stress in the structure of the wing (2), and an actual-displacement arithmetic unit (23) for calculating the actual displacement of the predetermined point on the wing (2), on the basis of the sensor output and a wing structure characteristic of the sensed predetermined point. The normal-wing-displacement prediction means (41) may comprise an avionics (42) for outputting the information signal and a predicted-value arithmetic unit (43) for calculating the predicted displacement of the wing (2) at the predetermined point during the normal flight, on the basis of the relationship between a wing lift and the information signal and the relationship between the lift and the wing structure characteristic. The command-signal correction means (61) may comprise a state observer (62), to which the difference signal from the disturbance-component estimation means (31) is inputted and in which the difference signal is processed to generate estimation signal representing a wing displacement state by disturbance and the estimation signal is multiplied by a feedback gain to generate feedback signal, and further may comprise an arithmetic circuit (63) to which the feedback signal is inputted, the actuation command signal outputted from the flight control command means (51) being corrected with the feedback signal. A pair of the control surface (3) and the actuator (11) may be provided at a plurality of positions on the wing (2). The flight control command means (51) may output actuation command signals (C1–Cn) to the individual actuators, respectively. The sensor (222-22n) of the wing-displacement measurement means (21) may be provided at a plurality of positions on the wing (2). The actual-displacement arithmetic unit (23) of the wing-displacement measurement means (21) may comprise a multiplexer (24) for converting the individual sensor outputs into a single signal column vector and an arithmetic circuit (25) for converting the signal column vector from the multiplexer (24) into a wing displacement column vector corresponding to the plurality of positions, on the basis of a structure characteristic of the wing (2). The predicted-value arithmetic unit (43) of the normal-wing-displacement prediction means (41) may comprise a multiplexer (44) for converting the actuation command signals (C1–Cn) into a single signal column vector, a lift arithmetic circuit (46) for calculating and outputting a lift predicted-value column vector on the basis of the signal column vector outputted from the multiplexer (44) and of the information signal outputted from the avionics (42), and an arithmetic circuit (47) for converting the lift predicted-value column vector outputted from the lift arithmetic circuit (46) into a wing displacement predicted-value column vector corresponding to the plurality of positions on the basis of the structure characteristic of the wing (2). The command-signal correction means (61) may generate an estimated signal column vector of the wing displacement state which is then multiplied by a predetermined feedback gain and output the multiplied signal as a feedback signal vector, the feedback signal vector being supplied through a demultiplexer (65) to obtain a corrected signal vector for respectively correcting the actuation command signals (C1–Cn).

In accordance with the present invention, from the difference between the output signal of the wing-displacement measurement means (21) measuring an actual displacement of the wing and the output signal of the normal-wing-displacement prediction means (41) predicting a displacement of the wing during normal flight in which no disturbance occurs, the component of the wing displacement caused by disturbance is estimated by the disturbance-component estimation means (31). On the basis of the output signal of the disturbance-component estimation means (31), the output signal of the flight control command means (51) is corrected by the command-signal correction means (61) so that the wing displacement by disturbance is compensated. Consequently, an active flutter control can be performed with the aid of actuators for controlling normal control surfaces, without interfering with a normal control surface control and an increase in wing weight.

In addition, on the basis of the sensed signal representing the strain of the wing structure and of the characteristic of the wing structure, the actual wing displacement at a predetermined point is measured, and on the basis of the relationship between the lift of the wing and the flight state and environmental information and the relationship between the wing lift and the wing structure characteristic, the wing displacement at the predetermined point during normal flight is predicted. The output signal of the disturbance-component estimation means (31) is outputted to the state observer (62) and processed to generate an estimated signal vector of the wing displacement state of the predetermined point by disturbance. On the basis of the feedback signal which is a product of the estimated signal and the feedback gain, the command signal from the flight control command means (51) is corrected. Therefore, even if the wing 2 undergoes disturbance such as pressure change and gust, an active flutter control can be performed accurately and finely with the aid of the actuator for controlling a normal control surface.

Further, if a pair of the control surface and the actuator is provided at a plurality of positions on the wing and if the strain sensor is provided at a plurality of positions on the wing which do not coincide with vibration nodes, it will also become possible to control flutter in which a plurality of vibration modes exist.

BRIEF DESCRIPTION OF THE DRAWINGS

The above and other objects and advantages will become apparent from the following detailed description when read in conjunction with the accompanying drawings wherein:

FIG. 3 is a schematic view showing the relationship between the sensors of FIG. 2 and the wing displacements.

DESCRIPTION OF THE PREFERRED EMBODIMENTS

Figure 1:
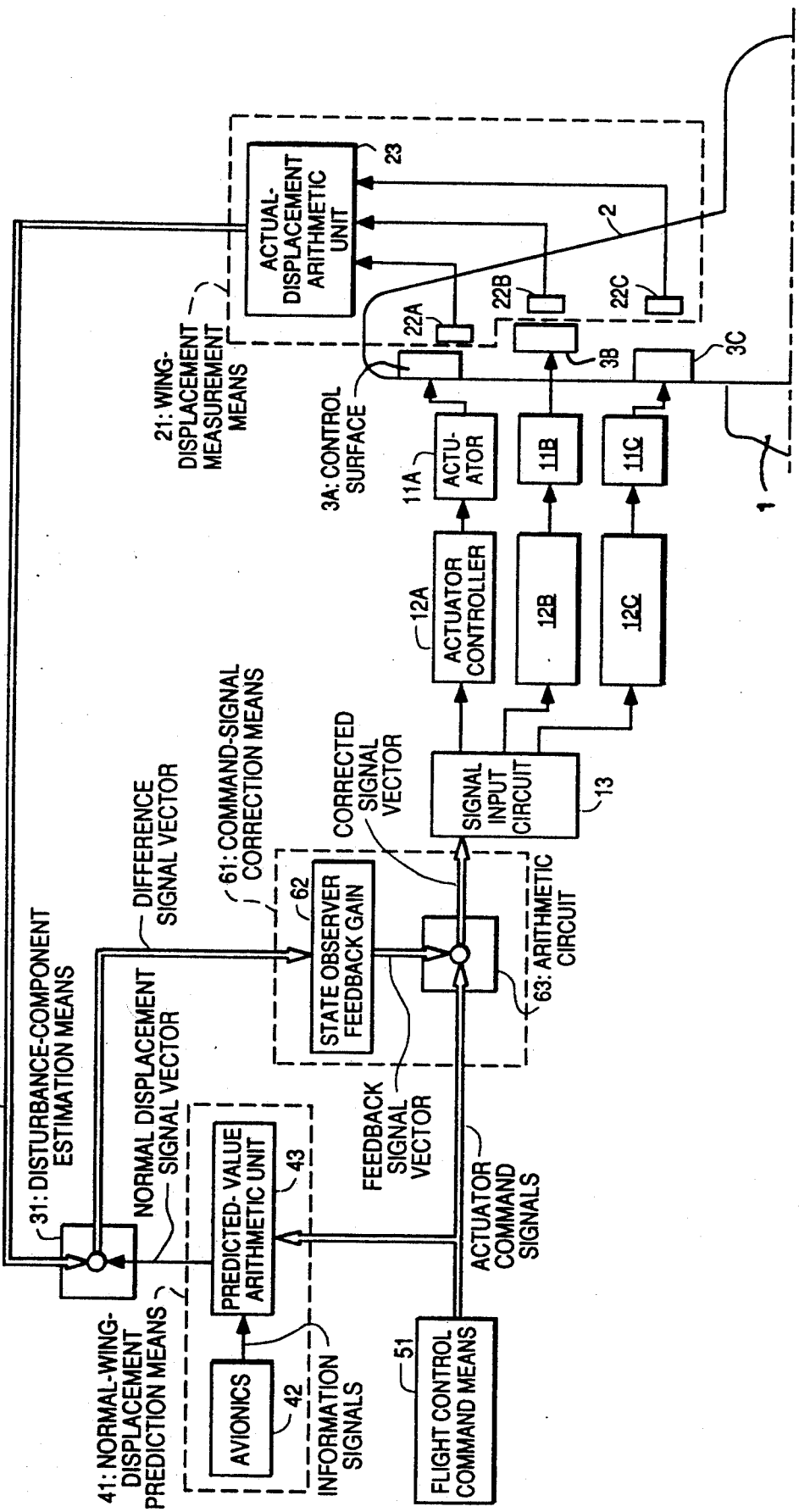
FIG. 1 is a block diagram schematically illustrating one embodiment of a flutter control system of an aircraft wing in accordance with the present invention.

Referring to FIG. 1, there is shown a preferred embodiment of a flutter control system in accordance with the present invention.

In FIG. 1, reference numeral 1 denotes an aircraft, which comprises a main wing 2. The main wing 2 is provided with control surfaces, such as an aileron 3A, a spoiler 3B and a flap 3C, and actuators 11A, 11B and 11C for controlling these control surfaces 3A, 3B and 3C. The actuators 11A, 11B and 11C are connected with actuator controllers 12A, 12B and 12C, respectively. In accordance with command signals from a signal input circuit 13, the actuator controllers 12A, 12B and 12C control the actuators 11A, 11B and 11C, respectively.

Reference numeral 21 denotes wing-displacement measurement means which measures an actual displacement of the wing 2 and outputs a signal corresponding to the actual wing displacement. The wing-displacement measurement means 21 includes sensors 22A, 22B and 22C, which are mounted close to the control surfaces 3A, 3B and 3C to sense strains caused by the stress of the wing structure (e.g., spars and ribs), and also includes an actual-displacement arithmetic unit 23 for calculating actual displacements of predetermined points on the wing 2 on the basis of the output signals of the sensors 22A, 22B and 22C and of the wing structure characteristics of the sensed predetermined points. The actual-displacement arithmetic unit 23 outputs a multiple signal corresponding to the result of the calculation to disturbance-component estimation means 31. It is noted that the sensors 22A, 22B and 22C are attached so that the positions thereof do not coincide with a vibration node in an arbitrary flutter mode of the wing 2.

The disturbance-component estimation means 31 receives the output signal of the wing-displacement measurement means 21 and an output signal of normal-wing-displacement prediction means 41 to be described later, and outputs a difference signal between these signals, as a signal for estimating the displacement component of the wing 2 caused by disturbance.

The normal-wing-displacement prediction means 41 includes an avionics 42 for outputting an information signal representing information about the actuation positions of the actuators 11A, 11B and 11C, atmospheric density, flight speed (airspeed), etc., and also includes a predicted-value arithmetic unit 43 for calculating a predicted value of displacement of the wing 2 at the aforesaid predetermined positions during normal flight in which no disturbance occurs. The predicted value of displacement of the wing 2 is calculated on the basis of the relationship between the information signal from the avionics 42 and the lift of the wing 2, relationship between the wing lift and the structure characteristic of the wing 2 and of an output command signal of flight control command means 51. The normal-wing-displacement prediction means 41 outputs a signal corresponding to the predicted value to the disturbance-component estimation means 31.

Reference numeral 61 denotes command-signal correction means, which corrects, on the basis of the output signal of the disturbance-component estimation means 31, the output command signal of the flight control command means 51 so that the displacement of the wing 2 caused by disturbance is cancelled out. The command-signal correction means 61 includes a state observer 62 to which the output signal (difference signal mentioned above) of the disturbance-component estimation means 31 is inputted and which provides an estimation signal representing a wing displacement of the predetermined points on the wing 2 by disturbance. The estimation signal is then multiplied by a feedback gain to obtain a feedback signal. The feedback gain F is determined from desired damping and convergence. The command-signal correction means 61 further includes an arithmetic circuit 63 to which the output command signal of the flight control command means 51 and the feedback signal of the state observer 62 are inputted. The feedback signal outputted to the arithmetic circuit 63 corrects the command signal outputted from the flight control command means 51.

In the embodiment constructed as described above, the measurement signal from the wing-displacement measurement means 21 for actually measuring a displacement of the wing 2 during flight is outputted to the disturbance-component estimation means 31, and the signal from the normal-wing-displacement prediction means 41 for predicting a displacement of the wing during normal flight having no disturbance is outputted also to the disturbance-component estimation means 31. The difference signal between these signals is then outputted to the command-signal correction means 61. That is to say, the wing-displacement measurement means 21 measures an actual wing displacement of a predetermined point on the wing 2, on the basis of a detection signal representing a strain of the wing structure and of a characteristic of the wing structure. Also, the normal-wing-displacement prediction means 41 predicts a wing displacement of the above described predetermined point during the normal flight, on the basis of the flight state of the aircraft 1, relationship between environmental information, etc. and a lift of the wing and the relationship between the wing lift and the wing structure characteristic. Further, the difference signal between the actual wing displacement and the predicted wing displacement is supplied from the disturbance-component estimation means 31 to the command-signal correction means 61. Then, on the basis of the output signal of the disturbance-component estimation means 31, a displacement state of the wing 2 caused by disturbance is estimated by means of the state observer 62 of the command-signal correction means 61, and an estimation signal representing the state amount of the above described predetermined point caused by disturbance is multiplied by a feedback gain and outputted as a feedback signal. In response to the feedback signal, the arithmetic circuit 63 corrects the output signal from the flight control command means 51 so that the displacement of the wing 2 caused by disturbance is compensated. Therefore, if the wing 2 undergoes disturbance such as pressure change and gust, an active flutter control is performed accurately and finely with the aid of the actuators 11A–11C for controlling normal control surfaces, and the flutter control does not interfere with the control of control surfaces during normal flight in which there is no large disturbance.

As described above, in the embodiment of FIG. 1, the flutter can be actively controlled with the aid of existing flight control surfaces (control surfaces). Unlike prior art, it is not necessary to provide special-purpose control surfaces such as flutter suppressors. Therefore, with simple construction, the flutter phenomenon can be controlled without an increase in the weight of the wing 2. In addition, since in the embodiment of FIG. 1 the displacements of a plurality of wing parts are measured and also the flutter control is performed by means of a plurality of the control surfaces 3A–3C, it is also possible to control flutter phenomenon in which a plurality of vibration modes exist. Further, in addition to the flutter control, the present invention is also effective in gust load alleviation.

Figure 2:
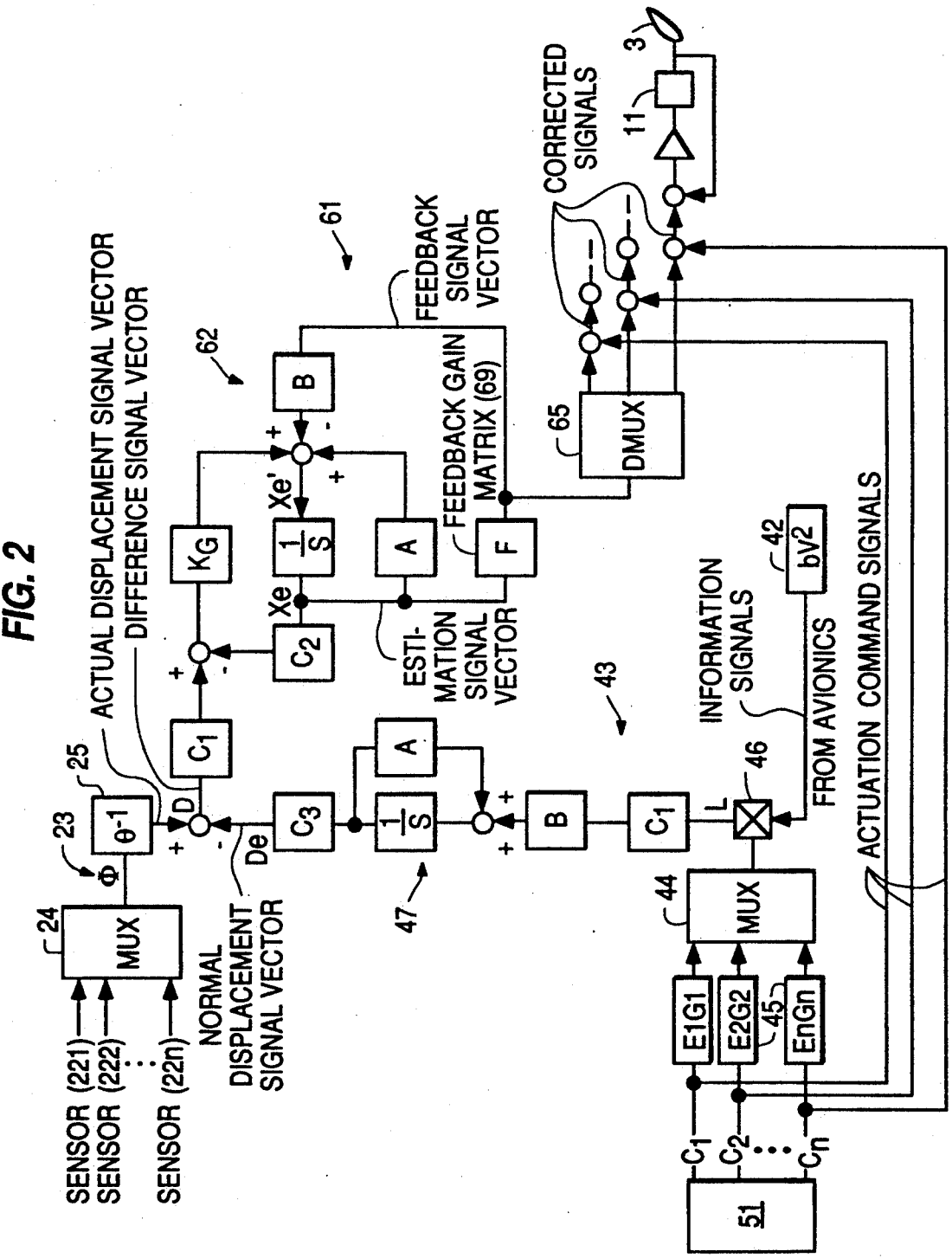
FIG. 2 is a block diagram schematically illustrating another embodiment of the flutter control system.

FIGS. 2 and 3 schematically illustrate another embodiment of the present invention. The same reference numerals will be applied to the parts of the embodiment of FIGS. 2 and 3 substantially identical to corresponding parts of the FIG. 1 embodiment and therefore a description of the corresponding parts will not be given.

In FIGS. 2 and 3, a wing 2 is provided with a plurality of pairs of a control surface 3 and an actuator 11 (although only one pair is shown, the number of pairs of a control surface and an actuator is n), and flight control command means 51 outputs actuation command signals C1–Cn to the actuators 11, respectively.

The state vector differential equation of the wing 2 can be expressed as follows:

$$x' = -U^{-1}Vx + U^{-1}u \qquad (1)$$

where $$U = \begin{bmatrix} 0 & M \\ M & R \end{bmatrix}, V = \begin{bmatrix} -M & 0 \\ 0 & K \end{bmatrix},$$

$$x = \begin{bmatrix} D1' \\ \vdots \\ Dn' \\ D1 \\ \vdots \\ Dn \end{bmatrix}, u = \begin{bmatrix} 0 \\ \vdots \\ 0 \\ L1 \\ \vdots \\ L2 \end{bmatrix},$$

M = mass matrix,
R = damping matrix,
K = rigid matrix,
Di = displacement of the ith part ($1 \leq i \leq n$), and
Li = external force to be exerted on the ith part ($1 \leq i \leq n$).

By setting $A = -U^{-1}V$ and $B = U^{-1}$, the above equation (1) becomes:

$$x' = Ax + Bu \qquad (2)$$

As shown in FIG. 3, wing-displacement measurement means 21 comprises a plurality of strain sensors 221–22n (e.g., strain gages, etc.) mounted on the right-side wing 2 along the center of torsion of the wing 2 (in this embodiment, the number of strain sensors is also n for the left wing) and an actual-displacement arithmetic unit 23. In this case, since it is assumed that the vibration mode of the measured parts by the flutter phenomenon is two dimensional, the relationship between the sensor output and the displacement of the part adjacent to the sensor will be as follows:

$$\Phi(m) = \theta(m - 1, m)[D(m - 1) - D(m)] -$$

$$\Phi(m + 1) = \theta(m, m + 1)[D(m) - D(m + 1)] -$$
$$\theta(m + 1, m + 2)[D(m + 1) - D(m + 2)]$$
$$\vdots$$

where $\theta$ is a spring constant between two adjacent measured parts and $\phi$ is an output of each sensor.

If the above relationship between the sensor output and the displacement is expressed in terms of vectors, the following equation will be obtained:

$$\phi = \theta D \qquad (3)$$

where $\phi$ is an output column vector of each sensor, $\theta$ is a coefficient matrix and D is a column vector of displacement.

That is to say, the wing displacement will be given by the following equation:

$$D = \phi^{-1}\theta \qquad (4)$$

Therefore, the actual-displacement arithmetic unit 23 converts the outputs of the individual sensors 221-22n into a single signal column vector $\phi$ (n×1). That is to say, the actual-displacement arithmetic unit 23 comprises a known multiplexer 24 transmitting several signals on a single wire and an arithmetic circuit 25 converting the output signal column vector $\phi$ (n×1) into a wing displacement column vector D (n×1) of a plurality of predetermined points on the basis of the wing structure characteristic. It is noted that the above equation (4) can be extended three dimensionally.

Since in the present invention the flutter phenomenon is controlled with the aid of normal control surfaces, it is necessary that the flutter control does not interfere with the flight control. For this reason, the wing displacement by the flight control actuation is predicted from the output information of an avionics 42 representing flight speed, air data and the like and from the control position information about each actuator 11. The lift amount of each part by the flight control actuation will be given by the following equation:

$$L(m) = Em \, b \, v^2 \, Gm \, Cm \qquad (5)$$

where Em is a characteristic constant of each control surface ($1 \leq m \leq n$), b is atmospheric density, v is air speed, Gm is a servo gain of each actuator 11, and Cm is an actuation command signal of the actuator 11.

By substituting equation (5) in equation (2), the predicted displacement can be obtained. More particularly, if substituting $u = [0 \ldots 0 \, L1 \ldots In]^T$, $x = [D1e' \ldots Dne' \, D1e \ldots Dne]$ is obtained and $De = [D1e \ldots Dne]$ will become a predicted displacement vector. It is noted that D1e is an estimated value of D1.

That is to say, the predicted-value arithmetic unit 43 of normal-wing-displacement prediction means 41 comprises a plurality of coefficient circuits 45 and multiplexer 44 for converting the actuation command signals c1-Cn to be outputted to the actuators 11 into a single signal column vector, a lift arithmetic circuit 46 for calculating and outputting a lift predicted-value column vector L (n×1) on the basis of the output signal column vector outputted from the multiplexer 44 and of the information signal $bv^2$ and the like from an avionics 42, and an arithmetic circuit 47 for converting the output signal L of the lift arithmetic circuit 46 into the wing displacement predicted-value column vector De on the basis of the wing structure characteristic.

If the predicted result De of the normal-wing-displacement prediction means 41 is subtracted from the measurement result D (n×1) by the wing-displacement measurement means 21, the response component by disturbance can be obtained. Then, by giving the response component as a state amount to the feedback system for equation (6) to be described later, a flutter control which does not interfere with the flight control actuation can be achieved.

The control method used in the embodiments of the present invention will hereinafter be described. It is noted that X to be used hereinafter is a wing displacement position caused by the above described disturbance and is different from x in the above described equation (1) which includes both the normal wing displacement position during flight and the wing displacement caused by the disturbance.

$$X' = AX + B\delta - BFXe \qquad (6)$$

where $A = -U^{-1}V$, $B = U^{-1}$, $\delta$ is a disturbance column vector, Xe is an estimated value of an internal state amount X and F is a feedback gain matrix. The feedback gain matrix F (69) can be obtained by a known control theory such as an optimum regulator system, pole assignment, etc. If the internal state amount X is employed, the wing displacement vector to be measured will become CX.

As described above, the state amount X contains a displacement Dm and the differential value Dm' ($1 \leq m \leq n$), and the estimation of Dm' can be performed by an analog circuit. However, Dm' is estimated with the aid of a state observer 62 in consideration of noises, etc. That is to say, command-signal correction means 61 comprises the state observer 62 which is expressed by the following equation (7):

$$Xe' = AXe - BFXe + KG(CX - CXe) \qquad (7)$$

where KG is a gain matrix for determining how fast the estimated displacement vector CXe converges to the actually measured displacement vector CX. For the determination of the gain matrix KG, a known theory such as a Kalman's filter, etc. can be applied.

The command-signal correction means 61 outputs a signal (FXe) which is equal to the estimated signal column vector FXe is supplied through a demultiplexer 61 to the individual actuators 11 and serves as correction signals corresponding to the individual actuator-actuation command signals.

Thus, in the embodiment of FIGS. 2 and 3, the wing displacement is measured with the aid of a plurality of the sensors 221-22n, and the flutter control is performed with the aid of the control surfaces 3 so that it does not interfere with a normal flight control actuation. The state vector differential equation of the whole structure can be expressed by the following equation:

$$Xe' = AXe - BFXe + KG[C1(D - De) - C2Xe] \qquad (8)$$

where
$D = \theta^{-1}\phi$,
$De = [D1e \ldots Dne]^T$, $$\begin{bmatrix} De'' \\ De' \end{bmatrix} = A \begin{bmatrix} De' \\ De \end{bmatrix} + B \begin{bmatrix} 0 \\ L \end{bmatrix},$$

$$De = C3 \begin{bmatrix} De' \\ De \end{bmatrix},$$

$L = [L1 \ldots Ln]^T$,
$L(m)$ = predicted value of lift of the mth control surface,
= Em b $v^2$ Gm Cm ($1 \leq m \leq n$),
Em = characteristic constant of the mth control surface,
b = atmospheric density,
v = air speed,
Gm = servo gain of each actuator,
Cm = actuator-actuation command signal from the flight control command means (51),
A = $-U^{-1}V$,
B = $U^{-1}$, $$U = \begin{bmatrix} 0 & M \\ M & R \end{bmatrix} 2n \times 2n,$$

$$V = \begin{bmatrix} -M & 0 \\ 0 & K \end{bmatrix} 2n \times 2n,$$

M = mass matrix of the wing,
R = damping matrix of the wing structure,
0 = zero matrix,
D = wing displacement vector,
De = predicted-value vector of D,
X = $[D' \ D]^T$,
Xe = estimated value of X,
$\phi$ = output column vector ($n \times 1$) of the sensor,
$\theta$ = coefficient matrix ($n \times n$) representing the relationship between $\phi$ and $\theta$, $$C1 = \begin{bmatrix} 0 \\ I \end{bmatrix} 2n \times n,$$

$$C2 = \begin{bmatrix} 0 & 0 \\ 0 & I \end{bmatrix} 2n \times 2n,$$

$$C3 = [0 \ I] n \times 2n, \text{ and}$$

I = identity matrix.

Also in the embodiment of FIGS. 2 and 3, the flutter phenomenon of aircraft wings can be actively controlled with the aid of existing control surfaces, with simple construction and without an increase in wing weight. Therefore, the same effect as the embodiment of FIG. 1 can be obtained. Further, by compactly adding the control algorithm of the FIG. 2 embodiment to an existing flight control law, a high independent control system can be achieved. Also, since a pair of the control surface 3 and the actuator 11 is provided at a plurality of positions on the wing 2 and since a plurality of the sensors 222-22n corresponding in number to the control surfaces are provided to synthetically estimate the internal state variables of the whole system, the wing flutter in which a plurality of vibration modes exist, as well as the wing flutter of a first-order mode, can be controlled.

Although the invention has been described with a certain degree of particularity, it is understood that the present disclosure has been made only by way of example and that numerous changes in the details of the construction and the combination and arrangement of parts may be made without departing from the scope of the invention as hereinafter claimed.

What I claim is:

1. A flutter control system of an aircraft wing comprising:

an actuator mounted on the aircraft wing to control a control surface;

flight control command means for outputting an actuation command signal for actuating said actuator;

wing-displacement measurement means for measuring an actual displacement of a predetermined point on said wing and outputting an actual displacement signal corresponding to the measured actual displacement;

normal-wing-displacement prediction means for predicting a normal displacement of said wing during normal flight in which no disturbance occurs, on the basis of said actuation command signal from said flight-control command means and of an information signal representing information about atmospheric density, flight speed and actuation position of said actuator and for outputting a predicted normal displacement signal representing the predicted displacement during said normal flight;

disturbance-component estimation means for receiving said actual displacement signal from said wing-displacement measurement means and said predicted normal displacement signal from said normal-wing displacement prediction means and for outputting a difference signal between these signals; and command-signal correction means for correcting said actuation command signal outputted from said flight control command means so that a wing displacement by disturbance is cancelled out, on the basis of said difference signal from said disturbance-component estimation means.

2. A flutter control system as set forth in claim 1, wherein said wing-displacement measurement means comprises a sensor for sensing strain caused by stress in the structure of said wing, and an actual-displacement arithmetic unit for calculating said actual displacement of said predetermined point on said wing, on the basis of the sensor output and a wing structure characteristic of the sensed predetermined point, wherein said normal-wing-displacement prediction means comprises an avionics for outputting said information signal and a predicted-value arithmetic unit for calculating said predicted displacement of said wing at said predetermined point during said normal flight, on the basis of the relationship between a wing lift and said information signal and the relationship between said lift and said wing structure characteristic, and wherein said command-signal correction means comprises a state observer, to which said difference signal from said disturbance-component estimation means is inputted and in which said difference signal is processed to generate an estimation signal representing a wing displacement state by disturbance and the estimation signal is multiplied by a feedback gain to obtain a feedback signal, and further comprises an arithmetic circuit to which said feedback signal is inputted, said actuation command signal outputted from said flight control command means being corrected with said feedback signal 3. A flutter control system as set forth in claim 2, wherein a pair of said control surface and said actuator is provided at a plurality of positions on said wing, said flight control command means outputs actuation command signals to the individual actuators, respectively, said sensor of said wing-displacement measurement means is provided at a plurality of positions on said wing, said actual-displacement arithmetic unit of said wing-displacement measurement means comprises a multiplexer for converting the individual sensor outputs into a single signal column vector and an arithmetic circuit for converting said signal column vector from said multiplexer into a wing displacement column vector corresponding to said plurality of positions, on the basis of a structure characteristic of said wing, said predicted-value arithmetic unit of said normal-wing-displacement prediction means comprises a multiplexer for converting said actuation command signals into a single signal column vector, a lift arithmetic circuit for calculating and outputting a lift predicted-value column vector on the basis of said signal column vector outputted from said multiplexer and of said information signal outputted from said avionics, and an arithmetic circuit for converting said lift predicted-value column vector outputted from said lift arithmetic circuit into a wing displacement predicted-value column vector corresponding to said plurality of positions on the basis of said structure characteristic of said wing, and said command-signal correction means outputs an estimated signal column vector of said wing displacement state, the estimated signal column vector being supplied through a demultiplexer as correction signals for respectively correcting said actuation command signals.

* * * * *